United States Patent
Gulick et al.

(10) Patent No.: US 6,532,019 B1
(45) Date of Patent: Mar. 11, 2003

(54) INPUT/OUTPUT INTEGRATED CIRCUIT HUB INCORPORATING A RAMDAC

(75) Inventors: Dale E. Gulick, Austin, TX (US); Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/502,068

(22) Filed: Feb. 10, 2000

Related U.S. Application Data

(63) Continuation-in-part of application No. 09/098,854, filed on Jun. 17, 1998.

(51) Int. Cl.[7] .................................................. G06F 15/76
(52) U.S. Cl. ........................................ 345/519; 345/542
(58) Field of Search ................................. 345/519, 520, 345/541, 542, 531, 558, 545, 501; 710/305, 306, 309, 313

(56) References Cited

U.S. PATENT DOCUMENTS

| | | | |
|---|---|---|---|
| 5,422,883 A | 6/1995 | Hauris et al. ................ 370/62 |
| 5,450,411 A | 9/1995 | Heil .......................... 370/94.2 |
| 5,621,898 A | 4/1997 | Wooten ...................... 395/297 |
| 5,640,392 A | 6/1997 | Hayashi ...................... 370/395 |
| 5,712,664 A | * 1/1998 | Reddy ......................... 345/519 |
| 5,742,847 A | 4/1998 | Knoll et al. .................. 395/866 |
| 5,758,075 A | 5/1998 | Graziano et al. ........ 395/200.8 |
| 5,758,105 A | 5/1998 | Kelley et al. ............... 395/293 |
| 5,761,430 A | 6/1998 | Gross et al. ........... 395/200.55 |
| 5,761,448 A | 6/1998 | Adamson et al. ........... 395/284 |
| 5,761,516 A | * 6/1998 | Rostoker et al. ............ 710/260 |
| 5,867,180 A | * 2/1999 | Katayama et al. .......... 345/542 |
| 5,872,994 A | 2/1999 | Chee ........................... 395/876 |
| 5,941,968 A | * 8/1999 | Mergard et al. ............. 710/308 |
| 5,948,080 A | 9/1999 | Baker .......................... 710/37 |
| 5,961,617 A | * 10/1999 | Tsang ......................... 345/555 |
| 5,977,997 A | * 11/1999 | Vainsencher ................ 345/519 |
| 5,995,121 A | * 11/1999 | Alcorn et al. ............... 345/520 |
| 6,011,784 A | 1/2000 | Brown et al. ............... 370/329 |
| 6,032,211 A | 2/2000 | Hewitt ........................ 710/107 |
| 6,148,357 A | * 11/2000 | Gulick et al. ............... 710/309 |
| 6,151,651 A | 11/2000 | Hewitt et al. ............... 710/128 |

OTHER PUBLICATIONS

Microprocessor Report, "NeoMagic puts graphics system in one chip" by Linley Gwennap, vol. 9, No.3, Mar. 6, 1995.*
Intel Corporation, "Accelerated Graphics Port Interface Specification", Revision 1.0, Jul. 31, 1996, pp. 1–152.
Wickelgren, Ingred J., "The Facts About Fire Wire", IEEE Spectrum, Apr. 1997, pp. 20–25.
Glaskowsky, Peter N., "Cyrix Creates Ultimate CPU for Games", Microdesign Resources, Dec. 8, 1997, pp. 16–18.
Gwennap, Linley, "MediaGX Targets Low–Cost PCs", Microprocessor Report, vol. 11, No. 3, Mar. 10, 1997, pp. 1–6.
Compaq, Digital Equipment Corp. IBM PC Company, Intel, Microsoft, NEC, and Northern Telcom, "Universal Serial Bus Specification", Revision 1.0, Jan. 15, 1996, pp. 3–268, particularly Chapters 4 and 5.

* cited by examiner

Primary Examiner—Kee M. Tung
(74) Attorney, Agent, or Firm—Zagorin, O'Brien & Graham, LLP

(57) ABSTRACT

A computer system includes a first integrated circuit that has a central processing unit (CPU) and a graphics controller. An I/O hub, which is coupled to a plurality of input/output buses, includes a RAMDAC. An interconnect bus couples the first integrated circuit and the I/O hub and carries both graphics data to or from a frame buffer and also carries asynchronous system data between the processor and the input/output integrated circuit. The frame buffer may be located in the I/O hub to reduce graphics traffic over the interconnect bus.

22 Claims, 8 Drawing Sheets

| Bit Time | 7 | 6 | 5 | 4 | 3 | 2 | 1 | 0 |
|---|---|---|---|---|---|---|---|---|
| 0 | Command-Specific | | Cmd[5:0] | | | | | |
| 1 | Command-Specific | | | | | | | |
| 2 | Command-Specific | | | | | | | |
| 3 | Command-Specific | | | | | | | |

FIG. 5A

| Bit Time | 7 | 6 | 5 | 4 | 3 | 2 | 1 | 0 |
|---|---|---|---|---|---|---|---|---|
| 0 | SeqId[3:2] | | Cmd[5:0] | | | | | |
| 1 | PassPW | SeqId[1:0] | | UnitID[4:0] | | | | |
| 2 | *Command-Specific* | | | | | | | |
| 3 | *Command-Specific* | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

FIG. 5B

| Bit Time | 7 | 6 | 5 | 4 | 3 | 2 | 1 | 0 |
|---|---|---|---|---|---|---|---|---|
| 0 | *Command-Specific* | | Cmd[5:0] | | | | | |
| 1 | Pass-PW | Bridge | *Cmd-Specific* | UnitID[4:0] | | | | |
| 2 | Rsv | | Error | *Command - Specific* | | | | |
| 3 | Rsv | | NXA | Rsv | | | *Command-Specific* | |

FIG. 5C

| BIT TIME | 7 | 6 | 5 | 4 | 3 | 2 | 1 | 0 |
|---|---|---|---|---|---|---|---|---|
| 0 | DATA[7:0] | | | | | | | |
| 1 | DATA[15:8] | | | | | | | |
| 2 | DATA[23:16] | | | | | | | |
| 3 | DATA[31:24] | | | | | | | |
| 4 | DATA[39:32] | | | | | | | |
| 5 | DATA[47:40] | | | | | | | |
| 6 | DATA[55:48] | | | | | | | |
| 7 | DATA[63:56] | | | | | | | |

FIG. 6

INPUT/OUTPUT INTEGRATED CIRCUIT HUB INCORPORATING A RAMDAC

CROSS REFERENCE TO RELATED APPLICATIONS

This application is a continuation-in-part of co-pending application Ser. No. 09/098,854, filed Jun. 17, 1998, entitled "Bus Optimized for Personal Computer Data Traffic" naming Larry D. Hewitt and Dale E. Gulick as inventors, which application is incorporated herein by reference.

BACKGROUND OF THE INVENTION

1. Field of the Invention

The invention relates to computer systems and more particularly to the graphics subsystem.

2. Description of the Related Art

Traditional personal computer architectures partition the computer system into the various blocks shown in the exemplary prior art system illustrated in FIG. 1. One feature of this prior art architecture is the use of the Peripheral Component Interconnect (PCI) bus 101 as the connection between the "north bridge" integrated circuit 103 and the "south bridge" integrated circuit 105. North bridge 103 functions generally as a switch connecting CPU 107, a graphics bus 109 such as the Accelerated Graphics Port (AGP) bus, PCI bus 101 and main memory 111. North bridge 103 contains the memory controller function. The architecture also includes the "host bus" connection 108 between north bridge 103 and CPU 107.

The south bridge 105 provides an interface to various input/output (I/O) portions of the computer system by providing, e.g., a bridge function between the PCI and legacy ISA bus 115, the Integrated Device Electronics (IDE) disk interface 117 and the Universal Serial Bus (USB) 119. Other devices, buses and functions may also be included in the South Bridge 105. In the illustrated prior art architecture, PCI bus 101 also functions as a major input/output bus for add-in functions such as network connection 121. The various busses and devices shown in FIG. 1 are conventional in the personal computer industry.

The exemplary graphics subsystem 123, illustrated in FIG. 1, couples to north bridge 103 over Accelerated Graphics Port (AGP) bus 109.

AGP 109 offloads graphics traffic from the PCI bus 101 and allows the graphics controller direct access to main memory 111 for graphics information (e.g. 3-D textures) stored in system memory. The graphics subsystem conventionally includes a graphics processor 124 for performing video calculations and video memory including frame buffer 125. The frame buffer provides a digital representation of the screen image. Video memory also typically includes memory storing data used in video calculations performed by the video processor. The size of video memory varies but typical graphics cards have memory on the order of e.g., 4–16 Mbytes. Another function provided by the graphics subsystem 123 is provided by the random access memory digital to analog converter (RAMDAC). The RAMDAC converts the digital representation of the screen stored in frame buffer 125 into analog data for display device 127. The RAMDAC may be for instance a 230 MHz RAMDAC with three 8 bit DACs providing the red, green and blue (RGB) signals to display 127.

One approach for providing lower cost personal computers is to provide an integrated graphics and northbridge function in order to try to reduce the number of system components. One disadvantage of such an approach is that the RAMDAC consumes a lot of power, e.g., on the order of 3W, making the power budget for the north bridge considerably higher than otherwise. Another cost savings approach, which may be used in conjunction with an integrated graphics and memory controller is to use system memory 111 for the video memory rather than providing for separate video memory. Such an approach is known as Unified Memory Architecture (UMA). The UMA approach can provide lower cost systems by eliminating separate video memory at the price of reduced graphics performance.

It would be desirable to reduce the cost of personal computers by providing a more highly integrated system without paying the penalty of high power consumption caused by the RAMDAC.

SUMMARY OF THE INVENTION

Accordingly, in one embodiment a computer system includes a first integrated circuit that has a central processing unit (CPU) and a graphics controller. An input/output integrated circuit, e.g., an I/O hub, which is coupled to a plurality of input/output buses, includes a RAMDAC. An communication link couples the first integrated circuit and the input/output integrated circuit and carries both graphics data to or from a frame buffer and also carries asynchronous system data between the processor and the input/output integrated circuit. The frame buffer may be located in the I/O hub, which further reduces graphics traffic over the communication link.

Another embodiment provides a method for communicating frame buffer data to an input/output integrated circuit that includes a RAMDAC, over a communication link connecting the input/output integrated circuit to a first integrated circuit that includes a graphics controller and a CPU. The method includes transferring frame buffer data from the first integrated circuit to the input/output integrated circuit over the communication link. The method further includes transferring input/output data between the CPU and the input/output integrated circuit over the communication link and transferring input/output data between the memory controller and the input/output integrated circuit over the communication link. If the frame buffer is located in the input/output integrated circuit, the frame buffer data is data written into the frame buffer. Otherwise, the frame buffer data is data being read from the frame buffer and provided to the input/output integrated circuit.

BRIEF DESCRIPTION OF THE DRAWINGS

The present invention may be better understood, and its numerous objects, features, and advantages made apparent to those skilled in the art by referencing the accompanying drawings in which use of the same reference symbols in different drawings indicates similar or identical items.

FIGS. 5A–5C show illustrative control packets.

FIG. 6 shows an illustrative data packet.

DESCRIPTION OF THE PREFERRED EMBODIMENT(S)

Figure 1:
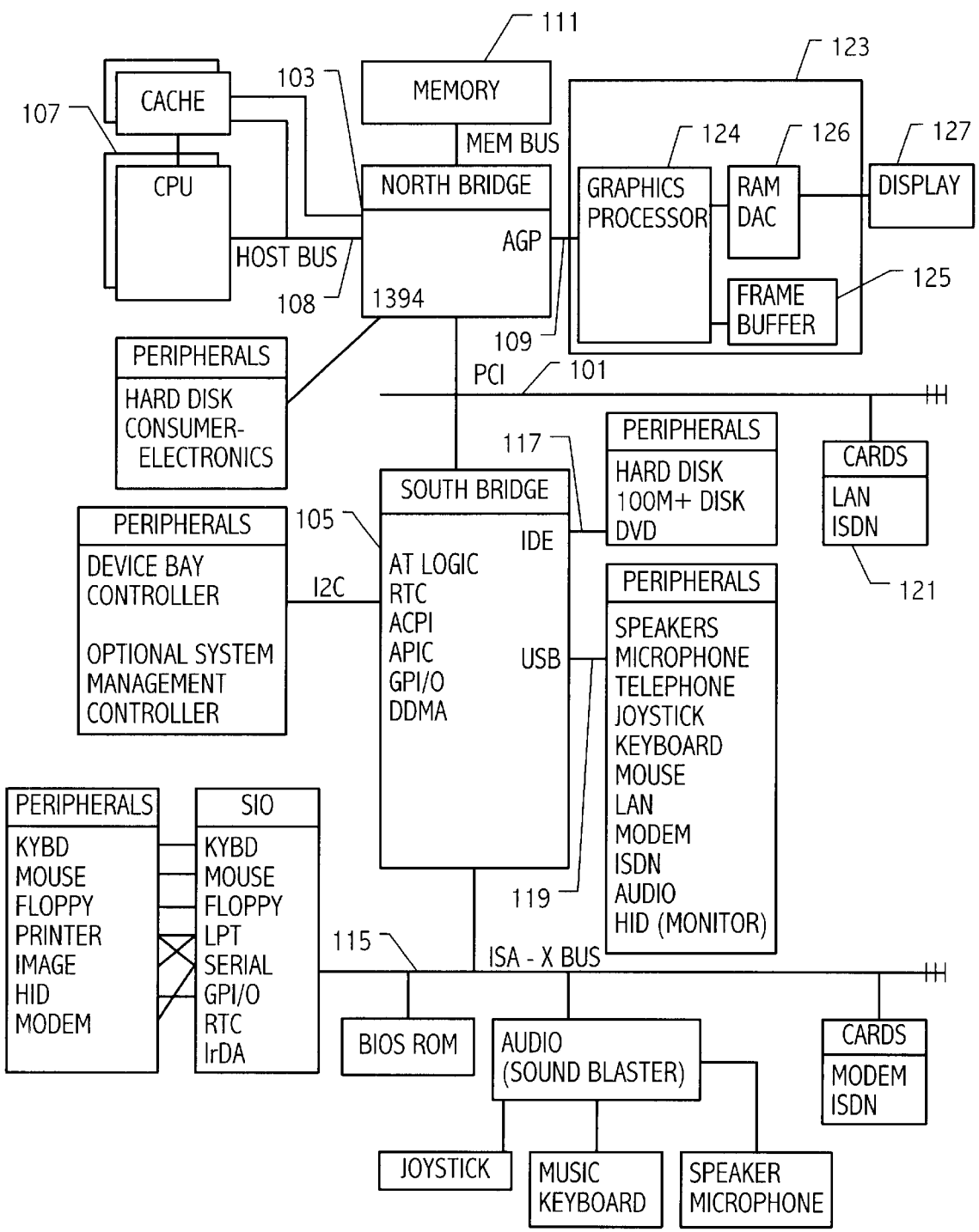
FIG. 1 shows an exemplary prior art computer system.
Figure 2:
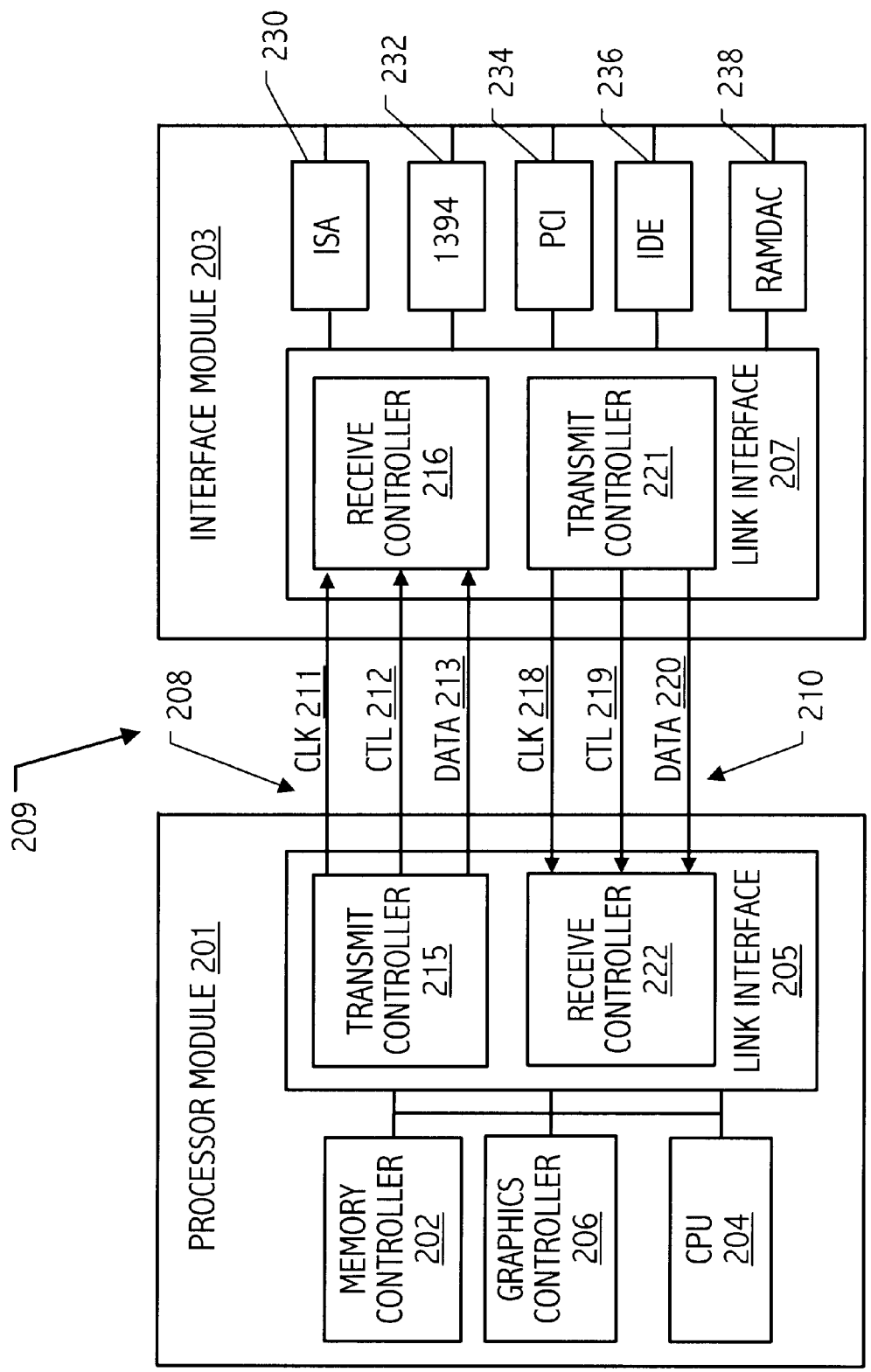
FIG. 2 shows a portion of an exemplary personal computer system according to one embodiment of the present invention utilizing a high speed interconnect.

Referring to FIG. 2, a portion of an exemplary personal computer system according to one embodiment of the present invention is shown. The computer system includes processor module 201 and interface module 203. Processor module 201 includes link interface 205 which is coupled to link interface 207 in interface module 203 via a high speed packet based interconnect (also referred to herein as link) 209. Link 209 connects processor module 201 and interface module 203 via two unidirectional sets of wires 208 and 210. One set of wires 210 on link 209 includes unidirectional clock line 211, control line 212 and data lines 213 connecting transmit controller 215 in processor module 201 to receive controller 216 in interface module 203. The second set of wires on link 209 includes unidirectional clock line 218, control line 219 and data lines 220 connecting transmit controller 221 in interface module 203 to receive controller 222 in processor module 201. The data lines 213 and 220 transmit command, address and data information between nodes 201 and 203. The transmit and receive controllers provide the control logic for link operations.

Each of the data lines 213 and 220 may include $2^n$ data bits where n>0. Thus, a minimum implementation has one data bit in each direction. However, each unidirectional connection is typically in byte multiples of 8, 16, 32 bits or larger and is fixed in size. Note however, that the link does not have to be symmetrical. In other words, data lines 213 may be one byte wide, while data lines 220 are four bytes wide. Each unidirectional connection 208 and 210 includes one control line, regardless of the number of data lines on that unidirectional portion.

In an exemplary embodiment, processor module 201 provides the major processing function in the computer system and includes memory controller 202, one or more central processing units (CPUs) 204, and graphics controller 206. Processor module 201 may include one or more integrated circuits. For example, processor module 201 may be a daughter card populated by a number of separate integrated circuits and plugs into a motherboard on which is mounted interface module 203. Alternatively, processor module 201 may be a single integrated circuit. System memory (not shown) is coupled to the memory controller 202. Interface module 203 in the exemplary embodiment shown in FIG. 2 is an interface module that functions as an I/O hub by providing an interface between various input/output devices such as hard drives, scanners, printers, network connections, modems etc., and the processor module. The exemplary I/O module 203 includes ISA interface 230 (providing an interface to the industry standard architecture (ISA) bus), IEEE 1394 interface 232, Peripheral Component Interconnect bridge (PCI) 234, Intelligent Drive Electronics (IDE) controller 236, and RAMDAC 238. In the exemplary embodiment interface module 203 is a single integrated circuit. Other types of buses and input/output devices may also be present on interface module 203 in place of or in addition to those described.

In one implementation, the link, as described in the co-pending patent application Ser. No. 09/098,854, entitled "Bus Optimized for Personal Computer Data Traffic", filed Jun. 17, 1998, previously incorporated herein by reference, link 109 provides guaranteed bandwidth and latency to each isochronous stream such as RAMDAC data, audio data, and 1394 isochronous streams while also attempting to minimize latency to asynchronous accesses such as CPU-initiated accesses and PCI-initiated accesses. That may be accomplished by guaranteeing a certain amount of bandwidth to isochronous streams during each predetermined time frame on the link. Additional details can be found in Ser. No. 09/326,304, entitled "Computer Interconnection Bus Link Layer", filed Jun. 4, 1999, by Dale Gulick, et al, which application is incorporated herein by reference. In another embodiment, providing guaranteed band width and latency may be accomplished by always giving highest priority to any isochronous packets, such as graphics data that would flow to RAMDAC 203. The latter approach assumes that the amount of isochronous data is small enough to not unduly impact the latency of CPU accesses. The key aspect of the link for the invention described herein is the ability to provide sufficient throughput to support both isochronous and asynchronous data streams over the same link connecting an integrated north bridge and an I/O hub such as interface module 203 within appropriate latency requirements for the respective streams. Current north bridge architectures utilizing the PCI bus do not provide that capability.

Figure 3:
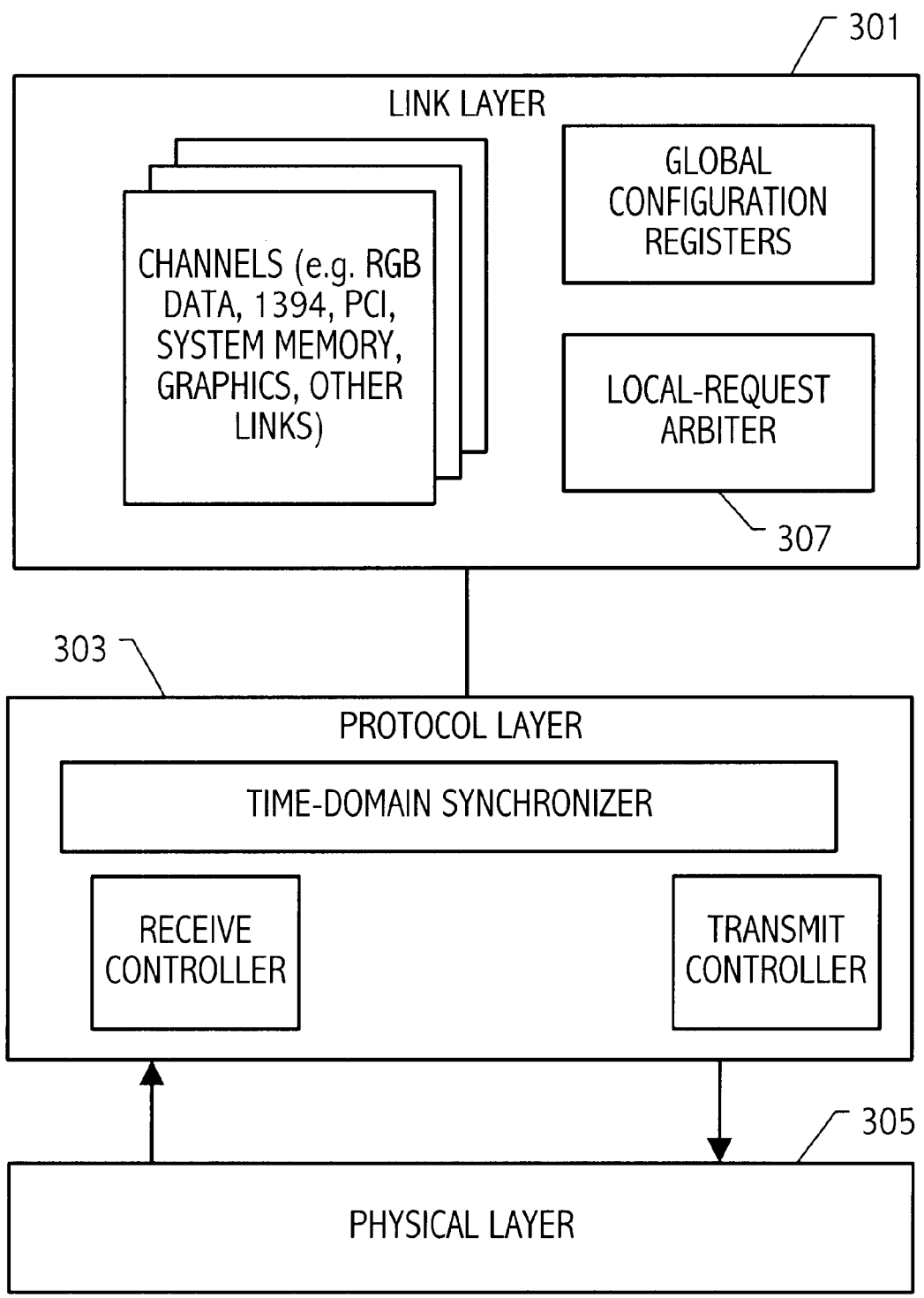
FIG. 3 illustrates the link layer, protocol layer 303, and physical layer 305 of an exemplary high speed interconnect.

In one embodiment, referring to FIG. 3, the bus includes link layer 301, protocol layer 303, and physical layer 305. The physical layer will depend on such factors as the frequency of the bus, the number of devices on the bus, the length of the bus, as is known to those of skill in the art. The specification for the physical layer and the protocol layer is generally device independent, except for variations of the bus width and frequency. The specification for the link layer varies based on the requirements of the device.

In one embodiment there is a virtual channel in the link layer for each fnctional unit connected to the bus. For example, processor module 201 (FIG. 2) may include three channels: one for the CPU, one for the memory controller and one for the graphics controller. The corresponding interface module 203 may include five virtual channels: one for the 1394 interface, one for the RAMDAC, one for the PCI bus, one for an IDE interface, and one for an expansion bus interface. Alternatively, virtual channels may be provided according to the type of traffic on the link. For example, I/O traffic may be provided a virtual channel separate from other kinds of traffic. The link layer also includes an arbiter 507 to determine the source of the next locally-generated bus cycle since there are typically multiple sources. The arbiters, in one particular embodiment guarantee bandwidth to isochronous streams (within a maximum latency) while minimizing latency to asynchronous accesses. Alternatively, the arbiters may always give priority to isochronous sources.

Figure 4:
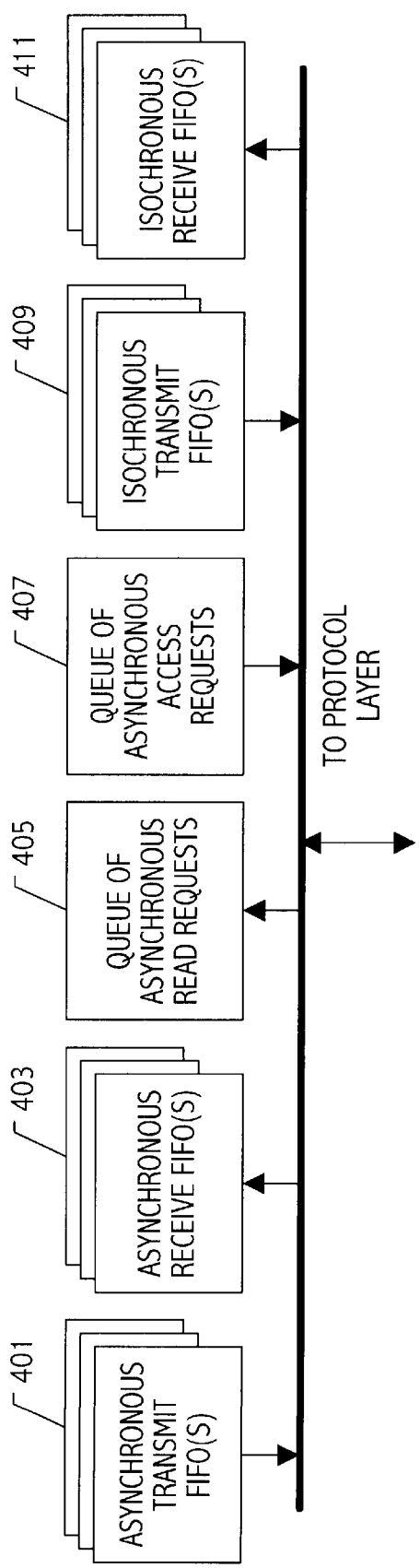
FIG. 4 illustrates a typical channel in the link layer.

Referring to FIG. 4 an exemplary channel in the link layer is shown. Each channel in the link layer includes FIFOs and queues of addressing information and data that have been sent across the bus or that will be sent across the bus. Thus, in FIG. 4 asynchronous transmit FIFO(s) 401 store asynchronous data that will be sent across the bus while asynchronous receive FIFO(s) 403 store asynchronous data received from the protocol layer. The channel shown in FIG. 4 also includes queues of asynchronous read requests 405 and access requests 407. Isochronous transmit and receive FIFO(s) 409 and 411 respectively store isochronous information for transmitting and store isochronous information that has been received.

The link layer hardware, unlike the protocol layer, is specific to the requirements of the local integrated circuit on which the link layer is implemented. FIFOs and queues are designed to the specific requirements of the channels being serviced by the link. Generally, the FIFOs of each channel are optional, based on the channel requirements. For example, one would not expect any isochronous transmit or receive FIFOs for the interface module's PCI block, since the PCI protocol does not allow for guaranteed isochronous data transfers (although, nothing prevents a designer from including these for the PCI bus channel). The interface module's RAMDAC interface 238 (FIG. 2), which provides data for the display, would typically require a single isochronous receive FIFO and potentially no asynchronous access FIFOs at all.

FIFOs utilized in the link layer may be designed with the following considerations in mind. The FIFO may contain isochronous or asynchronous data; the FIFO may transmit data to the link or receive data from the link; the FIFO has a predetermined size (in bytes); the FIFO may be a master (controlled by local timing) or a slave (responding only to accesses); if a FIFO is a slave, then design considerations include what causes the slave FIFO to be loaded. The FIFO target address may be static or it may increment with each byte, in which case it will be reloaded periodically.

The processor module's system memory channel has special requirements, since multiple streams from the interface module may attempt to access it. It requires several isochronous transmit and receive FIFOs and, potentially, multiple asynchronous FIFOs.

In the illustrated embodiment, link 209 is a point to point link physically connecting precisely two integrated circuits. In that way, transfer speed across the link may be maximized. A bit time on link 209 is half a clock (CLK) period in duration. That is, two data bits are transmitted on each wire per cycle on the link. For example, for a clock (CLK) rate of 400 megahertz, data is provided on each edge of the clock which results in 800 million bit times per second.

Link 209 transfers packet based information to and from a unit or function, which is a logical entity within a node, such as memory controller 202 that acts as a source or a destination for transactions. A node is a physical entity that connects to one end of the link. A transaction is a sequence of packets exchanged between two or more nodes in the system which results in a transfer of information. A source is the node that starts a transaction. A target is the node that ultimately services the transaction on behalf of the source. There may be intermediary nodes between the source and the destination. That is, the link may be configured as a daisy chain.

In addition to the data, CTL and CLK signals, each device in the link receives a PwrOk signal (not shown) indicating that power is stable and clocks have been running for a predetermined amount of time. Each device on the link also receives a reset signal (not shown).

The packet structure described herein is described with relation to 8 bit wide data lines. The packet structure for wider links, e.g., 16 and 32 bit links, can be derived from the 8-bit link packet structure by combining the fields within adjacent bit times. For example, $BT1_{16}[15:0]=BT2_8[7:0]\& BT1_8[7:0]$ $BT1_{32}[31:0]=BT4_8[7:0]\& BT3_8[7:0]\& BT2_8[7:0]\& BT1_8[7:0]$ where $BTN_m$ represents the Nth bit time within a packet for a link of width m and "&" represents concatenation. Thus, its takes two bit times to transfer the same information on an eight bit link as can be transferred on a sixteen bit link. Note that if all packets are multiples of 4 bytes long, packet boundaries will always fall on bittime boundaries in the 16 and 32 bit case, as well as the 8 bit case and thus CTL may only be asserted on 4 byte boundaries in certain implementations.

The link in the embodiment described herein is assumed to be a pipelined split transaction link in which transactions are tagged by the source and responses can return out of order. Write command and read response packets always have an associated data packet. The data packet associated with the write command is the write data. The data packet associated with the read response is the requested read data for a previously sent read command.

In one embodiment, the link transmits control packets and data packets. The control signals 212 or 219 distinguish between the two types of packets. Control packets provide control information. For example, the control information may indicate the kind of command (read or write) or an address to which the command is directed. Data packets carry data related to corresponding read or write operations.

In order to reduce latency for information in control packets and to provide flexibility, the CTL signal allows control packets to be inserted in the middle of data packets. That is particularly advantageous when data packets are long. In addition, the control signal can also be used to insert delays in the middle of control packets.

A data packet may not always immediately follow the last bit time of its associated control packet. That is another control packet can be placed between a control packet and its associated data packet, In the illustrated embodiment, CTL may only be deasserted when data transfer due to a previously transmitted control packet is pending, or in the middle of a control packet.

An exemplary packet structure is illustrated in FIGS. 5 and 6. All packets shown are multiples of 4 bytes long. The control packets illustrated are either four or eight bytes long. The details of the specific fields in the control packet depend upon the detailed implementation of the system which will vary from embodiment to embodiment. In the FIGS. 5A–5C, those fields that are command specific are indicated as such.

FIG. 5A illustrates a special control packet which is an "Info" packets. The Info packets are 5 bytes long and are used for nearest neighbor communication between nodes, and exist at a lower level of the protocol than anything else. They are not flow-controlled, and can always be accepted by their destination. (Flow control provides information relating to whether the target has sufficient resources available to accommodate a particular command.)

FIGS. 5B illustrates the common fields in a command packet. Command packets are either 4 or 8 bytes long, depending upon whether the command has an associated address. FIG. 5B shows an 8 byte command packet with a 4 byte address (bit times 5–8). 4-byte command packets do not contain the address field as illustrated in FIG. 5C. The common fields in the illustrated command packets include the command field (Cmd[5:0]) which defines the packet type. The Unit ID (UnitID[4:0]) identifies participants in a transaction on the link. In one embodiment, in which all packets are transferred either to or from a host bridge, i.e. the bridge coupling a CPU to the link, either the source or destination node is implied. The value zero is reserved for the Unit ID of the host bridge. The value 31 is reserved and is not used by any device. For requests, Unit ID denotes the source of the request. For responses travelling downstream (away from the host bridge), Unit ID denotes the node to which the response is being sent. For responses travelling upstream (towards the host bridge), Unit ID denotes the node that generated the response.

Nodes with multiple logical I/O streams may own multiple Unit ID values. For example, interface module 203 may be a node with multiple IDs associated with the various interfaces 230–238. Sequence ID (SeqId[3:0]) is used to tag groups of requests which were issued as part of an ordered sequence by a device, and must be strongly ordered within a virtual channel. All requests within the same I/O stream and virtual channel that have matching nonzero sequence ID fields have their ordering maintained. The sequence ID value of 00 is reserved to mean that a transaction is not part of a sequence. Transactions with this value have no sequence ordering restrictions, although they may be ordered for other reasons. PassPW indicates that this packet is allowed to pass packets in the posted request channel in the same I/O stream. Otherwise, it must stay in order behind them. Bytes three and four of the four byte command packet are command specific. The last four bytes (Addr[39:8]) represent the doubleword address accessed by the command. Not all address bits are included in all command types. Where finer granularity is required, byte enables may be used.

An exemplary control packet for a response is illustrated in FIG. 5C and is four bytes long. The bridge field indicates whether the response packet was placed onto the link by the host bridge, and is used to distinguish responses travelling upstream from responses travelling downstream. The Error bit is present in all responses, and used to indicate that the issued request could not be completed. If the error bit is set, the NXA (Non-eXistent Address) bit is valid. If it is set, that means that the request could not be completed because no agent on the chain accepted the request. If the bit is clear, it means that the request packet reached its addressed target, but could not be completed by the device.

The command field will of course vary from system to system. Exemplary commands include NOPs (no operation), write commands, read commands, and read responses. In addition, commands may relate to initialization of the links.

FIG. 6 illustrates an exemplary data packet, which contains the data payload for a transaction such as for RAMDAC 238. As previously described, data packets follow write command and read response packets. In one particular embodiment, data packets range in length from 4 to 64 bytes, in multiples of 4 bytes (1 doubleword). FIG. 6 illustrates an eight byte packet. Within a doubleword, data bytes appear in their natural byte lanes. For transfers of less than a full doubleword, the data may be padded with undefined bytes to achieve this byte lane alignment. Where the control line is asserted on 4 byte boundaries, if the control line is asserted during the data packet illustrated in FIG. 6 to stop the transfer and insert a control packet, the data packet is stopped after bit time 4.

Figure 7:
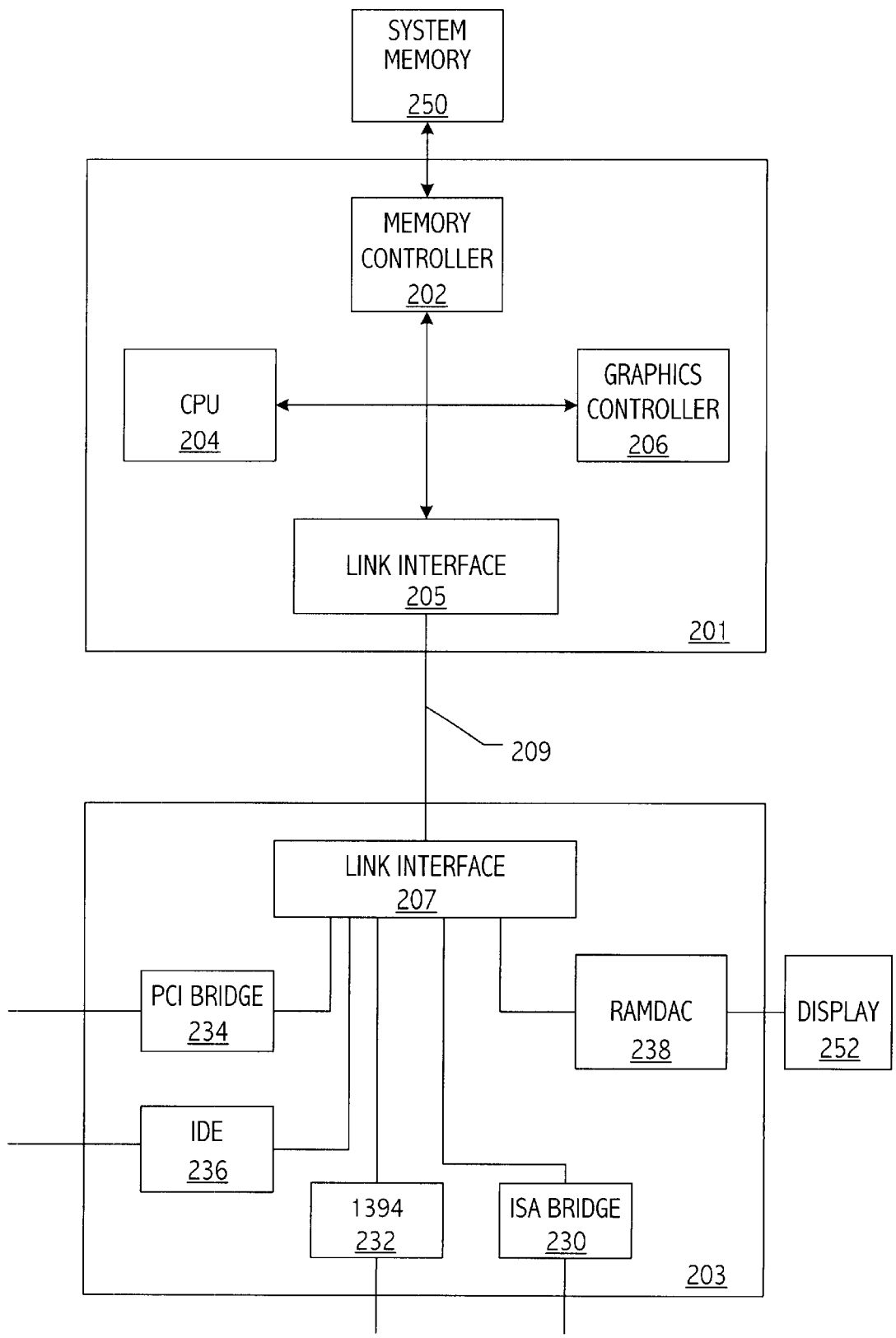
FIG. 7 depicts another exemplary embodiment of a personal computer system according to the present invention.

Referring to FIG. 7, another view of the computer system shown in FIG. 2 is provided. The computer system integrates CPU 204, graphics controller 206 and memory controller 202 onto processor module 201. Processor module 201 connects to interface module 203 via link 209. Note that link 209 may operate in accordance with one of the embodiments described herein or be another high speed link, e.g., a fiber optic link, that is capable of meeting throughput and latency requirements where high-bandwidth asynchronous traffic must be mixed with isochronous traffic. Interface module 203 provides an I/O hub for the computer system and may also provide other functions not illustrated, such as power management functions.

The key aspect of interface module 203 relevant to the present invention is the presence of RAMDAC 238. RAMDAC 238 converts the digital screen image from the frame buffer into analog data, which is provided to display 252. The frame buffer stores in digital form the video image displayed on monitor 238. In a typical application, the RAMDAC reads 400–600 Mbytes/second from the frame buffer. As the construction and operation of RAMDACs is well known in the art, RAMDACs are not described in detail unless necessary for greater understanding of the invention.

One advantage of placing the RAIDAC on interface module 203 rather than processor module 201 is that the RAMDAC consumes a relatively large amount of power, e.g., 3 W. Moving RAMDAC off of processor module 201 may simplify process technologies used in fabricating the integrated processor module 201 by eliminating a significant number of analog components which need to operate at voltages undesirable for the processor module 201. In addition, removing the RAMDAC from processor module 201 can significantly reduce its power budget.

The frame buffer may be located in processor module 201 as part of graphics controller 206. Alternatively, the frame buffer may instead utilize system memory 250 in a Unified Memory Architecture (UMA) approach that was previously described. The UMA approach does tend to reduce graphics performance, however such a performance reduction may not be a concern for a wide variety of applications. In a typical scenario, the RAMDAC requires frame buffer data at the rate of, e.g., 400–600 Mbytes per second. That results in 400–600 Mbytes per second peak of frame buffer traffic on link 209. If the link is operating at, e.g. 800 Mbytes per second, graphics traffic is consuming 50–75% of the bus cycles. While that may be tolerable in some systems, another option can significantly reduce the amount of RAMDAC traffic on link 209. Vertical refresh time reduces time interval.

Figure 8:
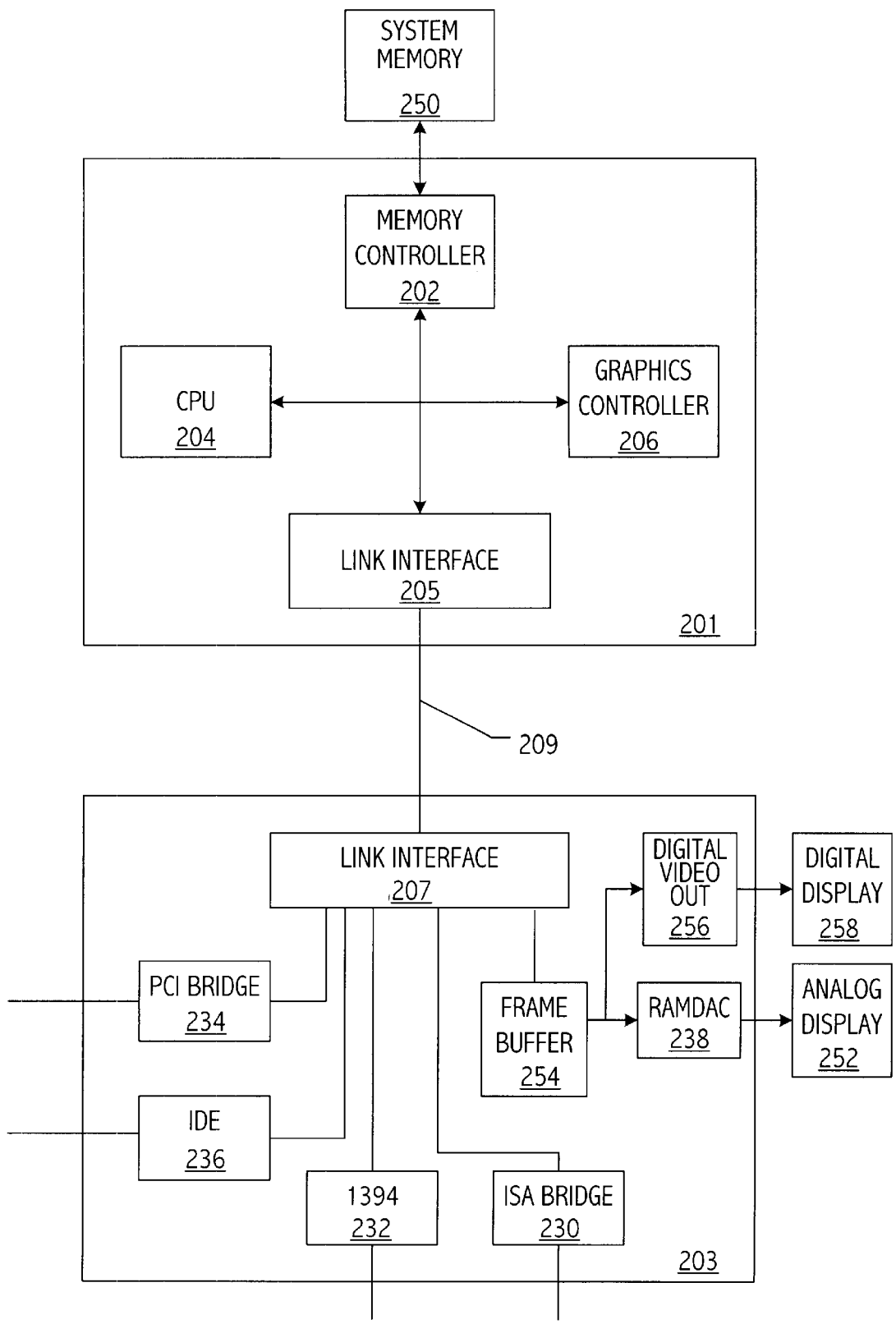
FIG. 8 depicts another exemplary embodiment of a personal computer system in which the frame buffer is located in the I/O hub.

Specifically referring to FIG. 8, frame buffer 254 may be located in interface module 203. Locating the frame buffer there does not affect the number of reads from the frame buffer. That is, in an exemplary system, the number of reads from the frame buffer is still 400–600 Mybtes per second peak. However those reads are no longer traffic on link 209. Instead they are simply reads from the locally available frame buffer. Link 711 still bears write traffic for the frame buffer. However, write traffic for the frame buffer is significantly less than read traffic, e.g., on the order of 8–100 Mbytes per second. There are fewer writes into the frame buffer than reads from the frame buffer because generally only a portion of a screen is updated each scan. Thus, the utilization of the link for graphics related traffic drops dramatically. The exemplary data rates provided here assume 1 million pixels with a 75 Hz refresh rate for the display. The amount of graphics related traffic will of course vary based on such factors as the number of bytes required for each pixel and the number of pixels.

In addition to an analog output, interface module 203 can also provide a digital video output port 256 to support digital display 258. Such digital displays include flat panel displays such as those found in notebook computers. Such displays utilize digital data as inputs to describe the screen display, rather than the analog outputs provided by RAMDAC 238. In an exemplary embodiment digital video port 256 provides 16 bits (4 control bits and 12 data bits) and supports a screen resolution of up to 1024 by 768.

As has been described, locating RAMDAC in interface module 207 reduces the power consumed by processor module 201 containing the CPU. Further advantages may be obtained by locating the frame buffer in interface module 203 which can significantly reduce link traffic.

The embodiments described so far have an integrated CPU/memory controller/graphics controller. In other embodiments, the memory controller and the graphics controller may be integrated, while the CPU is on a separate chip. In such a configuration it is still advantageous to locate the RAMDAC in interface module 203 for the same reasons given above.

What is claimed is:

1. A computer system comprising:
   a first integrated circuit, including a central processing unit (CPU) and a graphics controller;
   an input/output integrated circuit coupled to a plurality of input/output buses, the input/output integrated circuit including a random access memory digital to analog converter (RAMDAC); and
   an communication link coupling the first integrated circuit and the input/output integrated circuit, the communication link for carrying graphics data to or from a frame buffer and for carrying asynchronous system data between the processor and the input/output integrated circuit.

2. The computer system as recited in claim 1 wherein the first integrated circuit further includes the frame buffer.

3. The computer system as recited in claim 1 wherein the communication link carries frame buffer data from the frame buffer to the RAMDAC.

4. The computer system as recited in clam 1 wherein the first integrated circuit includes a graphics processor in the graphics controller and wherein the computer system further comprises a memory controller on the first integrated circuit and system memory coupled to the memory controller.

5. The computer system as recited in claim 3 wherein the computer system implements a unified memory architecture, whereby system memory is utilized for the frame buffer.

6. The computer system as recited in claim 1 wherein the input/output integrated circuit incorporates a frame buffer, the frame buffer being coupled to the RAMDAC.

7. The computer system as recited in claim 6 wherein the communication link carries frame buffer data to be written into the frame buffer on the input/output integrated circuit.

8. The computer system as recited in claim 1 wherein the input/output integrated circuit includes a digital video output port providing digital signals to a digital display device.

9. The computer system as recited in claim 1 wherein the input/output integrated circuit includes a bridge circuit coupling the communication link to a peripheral component interface (PCI) bus.

10. An integrated circuit providing an input/output hub for a computer system, the integrated circuit comprising:
    a plurality of interfaces for coupling to a plurality of input/output buses of a computer system and coupled to receive and transmit input/output data;
    a RAMDAC providing analog video outputs; and
    a link interface for coupling to a communication link, and coupled to the plurality of interfaces and the RAMDAC, the link interface coupled to receive frame buffer data over the link and coupled to receive and transmit input/output data over the link.

11. The integrated circuit as recited in claim 10 wherein the plurality of interfaces includes at least one for interfacing to one of a peripheral component interconnect (PCI) bus, a universal serial bus (USB) and a bus compatible with IEEE 1394.

12. The integrated circuit as recited in claim 10 further comprising a frame buffer coupled to receive the frame buffer data from the link interface and wherein the frame buffer is coupled to the RAMDAC.

13. The integrated circuit as recited in claim 10 wherein the RAMDAC is coupled to receive the frame buffer data from the link interface and the frame buffer is not located on the integrated circuit.

14. A method for communicating frame buffer data to an input/output integrated circuit including a RAMDAC over a communication link connecting the input/output integrated circuit to a first integrated circuit that includes a graphics controller and a CPU, the method comprising:
    transferring frame buffer data from the first integrated circuit to the input/output integrated circuit over the communication link;
    transferring input/output data between the CPU and the input/output integrated over the communication link; and
    transferring input/output data between the memory controller and the input/output integrated over the communication link.

15. The method as recited in claim 14 further comprising:
    writing the frame buffer data into a frame buffer in the input/output integrated circuit; and
    reading data from the frame buffer and into the RAMDAC for output on a display device.

16. The method as recited in claim 14 further comprising receiving the frame buffer data from a frame buffer over the communication link into the input/output integrated circuit.

17. The method as recited in claim 16 wherein the frame buffer data is received into a first in first out (FIFO) buffer.

18. The method as recited in claim 16 wherein the frame buffer is part of system memory in a UMA architecture.

19. The method as recited in claim 16 wherein the frame buffer is located is the first integrated circuit.

20. The method as recited in claim 14 further comprising sending data over the communication link to or from a device resident on an input/output bus.

21. The method as recited in claim 14 wherein the input/output bus is one of a peripheral component interconnect (PCI) bus, a universal serial bus (USB) and a bus compatible with IEEE 1449.

22. The method as recited in claim 14 further comprising outputting digital video data from the input/output integrated circuit.

* * * * *